United States Patent

[11] 3,622,622

[72] Inventor Horace A. DeWald
             Ann Arbor, Mich.
[21] Appl. No. 680,322
[22] Filed Nov. 3, 1967
[45] Patented Nov. 23, 1971
[73] Assignee Parke Davis & Company
             Detroit, Mich.

[54] α-[P-(DIMETHYLAMINOALKOXY) PHENYL]-α'-NITRO-4-METHOXYSTILBENE COMPOUNDS AND METHODS FOR THEIR PRODUCTION
     6 Claims, No Drawings

[52] U.S. Cl. ..................................260/501.18,
     260/343.7, 260/478, 260/490, 260/501.15,
     260/567.6 M, 260/570 R, 260/570.7, 260/591,
     260/612 R, 424/280, 424/330
[51] Int. Cl. .........................................C07c 93/06,
                                                  C07c 93/08
[50] Field of Search........................... 260/570,
                                                  501.18, 343.7

[56]              References Cited
             UNITED STATES PATENTS
2,971,001   2/1961   Palopoli et al. .............. 260/570 X
2,914,561  11/1959   Allen et al. .................. 260/570
2,914,562  11/1959   Allen et al. .................. 260/570
2,914,563  11/1959   Allen et al. .................. 260/570
2,914,564  11/1959   Allen et al. .................. 260/570
3,272,841   9/1966   DeWald ....................... 260/326.5

Primary Examiner—Robert V. Hines
Attorneys—Robert R. Adams, David B. Ehrlinger, George M. Richards and Edward J. Gall ABSTRACT: α- p-[3-(Dimethylamino)propoxy]phenyl -α'-nitro-4-methoxystilbene and α- p-[4-(dimethylamino)butoxy]phenyl -α'-nitro-4-methoxystilbene and acid-addition and quaternary ammonium salts thereof, useful as pharmacological agents that exhibit antiprogestational, hypocholesteremic, and antifertility activity; and their production by (a) reacting a 1-[p-(dimethylaminoalkoxy)phenyl]-1-(p-methoxyphenyl)-2-phenyl-ethanol compound or a α-[p-(dimethylaminoalkoxy)phenyl]-4-methoxystilbene compound with nitric acid, (b) reacting an α-[p-(dimethylaminoalkoxy)phenyl]-4-methoxystilbene compound with a lower alkanoyl nitrate and then heating the intermediate 1-(p-methoxyphenyl)-1-alkanoyloxy-1-[p-(dimethylaminoalkoxy)phenyl]-2-nitro-2-phenylethane compound with a strong acid, (c) reacting a 1-[p-(dimethylaminoalkoxy)phenyl]g8-1-(p-methoxyphenyl)-2-nitro-2-phenylethane compound with a dehydrogenating agent, (d) reacting a metallated salt derivative of α-(p-hydroxyphenyl)-α'-nitro-4-methoxystilbene with a N,N-dimethyl-3-halopropylamine or a N,N-dimethyl-4-halobutylamine, and (e) reacting a α-[p-(haloalkoxy)phenyl]-α'-nitro-4-methoxystilbene compound with dimethylamine.

α-[P-(DIMETHYLAMINOALKOXY) PHENYL]-α'-NITRO-4-METHOXYSTILBENE COMPOUNDS AND METHODS FOR THEIR PRODUCTION

SUMMARY AND DETAILED DESCRIPTION

The present invention relates to new organic nitrocompounds that are useful as pharmacological agents and to methods for their production. More particularly, the invention relates to new α-[p-(dimethylaminoalkoxy)phenyl]-α'-nitro-4-methoxystilbene compounds having in free base form the formula

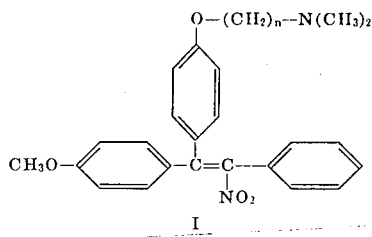

and to pharmaceutically acceptable acid-addition and quaternary ammonium salts thereof; where n is 3 or 4.

In accordance with the invention, compounds having formula I and their salts are produced by reacting a triarylethanol compound having the formula

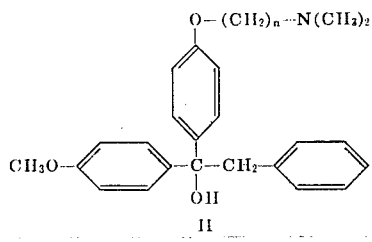

or a triarylethylene compound having the formula

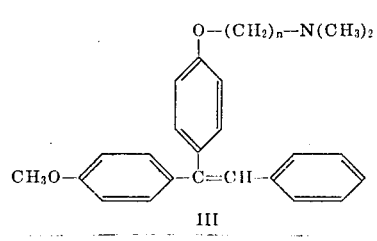

with nitric acid; where n is as defined previously. At least 1 and preferably up to 4 moles or more of nitric acid are used for each mole of the triarylethanol or triarylethylene compound. The reaction is advantageously carried out in an unreactive solvent medium. Some suitable solvents for this purpose are alkanoic acids, such as acetic acid or propionic acid, and halogentated hydrocarbons, such as carbon tetrachloride. The concentration of the nitric acid and the time and temperature of the reaction are not especially critical. In general, the reaction is carried out at a temperature between about 20° and about 100° C. for a period that may vary from 1 minute to several hours, the shorter reaction times being used with the higher temperatures. The reaction is preferably carried out using 90 percent (fuming) nitric acid at 40°–65° C. for 5 to 20 minutes. The product of the reaction can be isolated directly as the nitrate salt; following basification, as the free base; or following basification and subsequent salt formation, as an acid-addition or quaternary ammonium salt.

In the foregoing process, it is not critical whether the starting material selected for use is the triarylehanol compound or the triarylethylene compound, since the former can be converted into the latter by dehydration during the course of the reaction with nitric acid. For the same reason, a mixture of the triarylethanol compound and the triarylethylene compound can be used as a starting material with entirely satisfactory results. The triarylethanol compounds can be produced by the reaction of a benzophenone compound having the formula

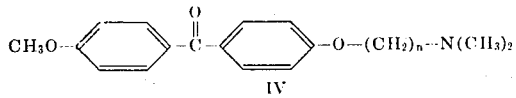

with benzyl magnesium chloride in an anhydrous ethereal solvent, followed by hydrolysis of the reaction mixture with aqueous ammonium chloride; where n is as defined earlier. The triarylethylene compounds are produced by dehydration of the triarylethanol compounds, for example, by heating with hydrogen chloride in ethanol or with 85 percent sulfuric acid for 1 to 3 hours at 70°–100° C. The triarylethylene compounds can also be obtained directly from the reaction of the benzophenone compound of formula IV and benzyl magnesium chloride by using a mineral acid for hydrolysis of the reaction mixture and employing a longer time or higher temperature during the hydrolysis. On the other hand, if it is desired to obtain the triarylethanol compound from this reaction, prolonged treatment with mineral acid should be avoided. In any particular case, the identity of the reaction product as the triarylethanol compound or the triarylethylene compound can be conveniently determined by examining the infrared absorption spectrum for absorption due to a hydroxyl group. Strong hydroxyl absorption indicates that the product is the triarylethanol compound, whereas absence of such absorption indicates that dehydration has occurred, and the product is the triarylethylene compound. Weak hydroxyl absorption indicates that a mixture of the two has been formed.

The benzophenone compounds having the formula IV above are prepared by reacting anisic acid with a haloalkyl phenyl ether compound having the formula

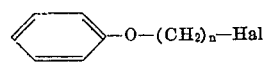

in the presence of a strong acid, such as polyphosphoric acid, to give a 4-(haloalkoxy)-4'-methoxybenzophenone compound having the formula

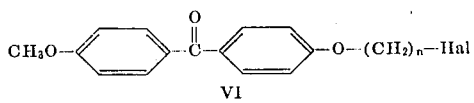

which in turn is reacted with dimethylamine; where n has the same meaning as previously given, and Hal is a halogen atom, preferably bromine or chlorine.

Also in accordance with the invention, compounds having formula I above and their salts are produced by reacting a triarylethylene compound having formula III above with a lower alkanoyl nitrate to produce a compound having in free base form the formula

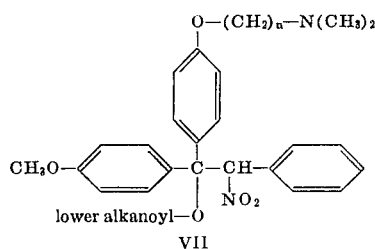

followed by heating the compound so produced with a strong acid, whereby elimination of the elements of a lower alkanoic acid occurs with introduction of a double bond; where n has the aforementioned significance. The preferred lower alkanoyl nitrate for use in this process is acetyl nitrate. The first step of the process is carried out by reacting the triarylethylene compound with at least one equivalent or up to a moderate excess of the lower alkanoyl nitrate. The reaction is moderated by external cooling with the temperature maintained between $-25°$ and $+10°$ C. A suitable solvent for the reaction is a lower alkanoic acid anhydride, and the reaction is ordinarily carried out following the production of the preferred acetyl nitrate in situ from the reaction of nitric acid and acetic anhydride. The second step of the process is carried out by heating the intermediate 1-alkanoyloxy-2-nitro compound of formula VII above with a strong acid. Some examples of suitable strong acids that may be used are phosphoric acid, sulfuric acid, and p-toluenesulfonic acid. Best results are obtained when a large excess of the strong acid is used without added solvent, but if desired, an unreactive solvent, such as a halogenated hydrocarbon, can be used. Heating with the strong acid is usually carried out at a temperature between $80°$ and $120°$ C. for a period that may vary from 15 minutes to 2 hours. Satisfactory results may also be obtained by operating somewhat outside of these limits. The product can be isolated directly as an acid-addition salt; following basification, as the free base; or following basification and subsequent salt formation, as an acid-addition or quaternary ammonium salt.

Further in accordance with the invention, compounds having formula I are produced by reacting a triarylnitroethane compound having the formula

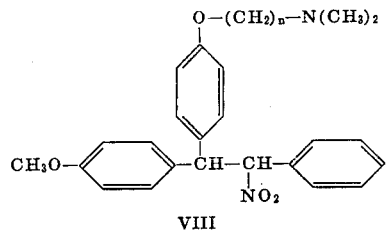

VIII with a dehydrogenating agent; where n is as previously defined. At least the calculated amount, and preferably a considerable excess of the dehydrogenating agent, is used. One example of a suitable dehydrogenating agent is a noble metal catalyst in combination with a hydrogen acceptor, such as a palladium catalyst in combination with an organic nitrocompound, for example, nitrobenzene. Another example of a suitable dehydrogenating agent is a benzoquinone. The reaction is carried out at a temperature between about 0° and 200° C., the preferred temperature being dependent on the particular dehydrogenating agent used. When a palladium catalyst and an organic nitrocompound are used, the usual temperature is one between 60° and 180°C., whereas when a quinone is used, the usual temperature is one between 0° and 120° C. Suitable solvents for the reaction include dioxane, lower alkanols, N,N-dimethylformamide, and various aromatic hydrocarbons, such as benzene, toluene, and xylene. Depending upon the reactants and the temperature employed, the reaction is substantially complete after a period that may vary from about 30 minutes to 3 days. The product can be isolated as the free base or, following salt formation, as an acid-addition or quaternary ammonium salt.

The triarylnitroethane compounds having formula VIII above that are required as starting materials in the foregoing process are produced by reacting 4-methoxy-α'-nitrostilbene with an arylmagnesium bromide having the formula

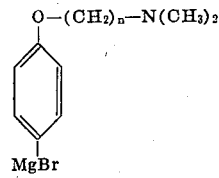

IX and then hydrolyzing the reaction product; where n is as previously defined.

Still further in accordance with the invention, compounds having formula I above are produced by reacting a metallated salt derivative of α-(p-hydroxyphenyl)-α'-nitro-4-methoxystilbene, said derivative having the formula

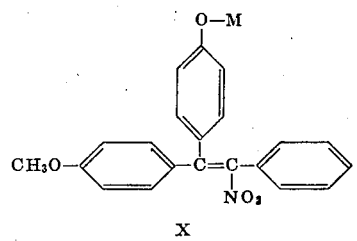

X with an amine compound having the formula $$Hal—(CH_2)_n—N(CH_3)_2 \quad XI$$

where n and Hal have the aforementioned significance, and M is a salt-forming cation, preferably an alkali metal. The metallated derivative having formula X can be added to the reaction mixture as such or formed in situ by reacting α-(p-hydroxyphenyl)-α'-nitro-4-methoxystilbene with a strong base such as sodium hydride, sodium methoxide, or potassium hydroxide. Best results are obtained when a moderate excess of the amine compound having the formula XI is used, although equivalent amounts of the reactants can also be used. Some examples of suitable solvents for the reaction are lower alkanols, N,N-dimethylformamide, and aromatic hydrocarbons, such as benzene, toluene, and xylene. In general, the reaction is carried out at a temperature between 0° and 200° C. or at the reflux temperature of the reaction mixture for a period that may vary from 30 minutes to 24 hours, the shorter reaction times being used with the higher temperatures. The product can be isolated as the free base or as an acid-addition or quaternary ammonium salt by adjustment of the pH or by salt formation.

The preparation of the α-(p-hydroxyphenyl)-α'-nitro-4-methoxystilbene used as starting material in the foregoing process is described in detail in the examples that follow.

Further yet in accordance with the invention, compounds having formula I above are produced by reacting a halogen compound having the formula

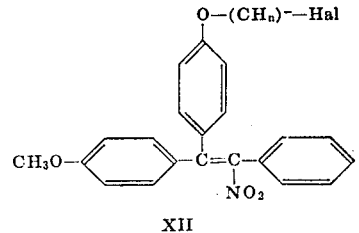

XII with dimethylamine; where n and Hal are as defined previously. While the reactants can be used in equivalent amounts, it is preferable to use a considerable excess of dimethylamine, typically 3 to 5 moles of dimethylamine for each mole of the halogen compound. Some examples of suitable solvents that may be used for the reaction are lower alkanols, ethers, and aromatic hydrocarbons, such as benzene, toluene, and xylene. An excess of the amine may also satisfactorily be used as solvent. In general, the reaction is carried out at a temperature between 10° and 150° C. for a period that may vary from 1 to 72 hours, with the shorter reaction times being used at the higher temperatures. The product of the reaction can be isolated as the free base or as an acid-addition or quaternary ammonium salt by adjustment of the pH or by salt formation.

The halogen compounds having formula XII that are required as starting materials in the foregoing process are prepared by reacting a 4-(haloalkoxy)-4'-methoxybenzophenone compound having formula VI above with benzylmagnesium chloride and hydrolyzing the reaction product to give a 1-[p-(haloalkoxy) phenyl]-1-(p-methoxyphenyl)-2-phenylethanol compound having the formula

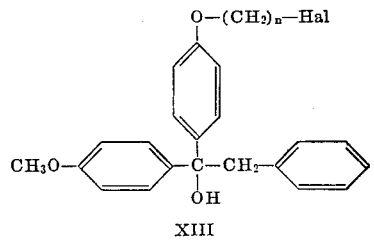

XIII which is then either reacted directly with fuming nitric acid or is first dehydrated and the dehydration product reacted with fuming nitric acid to give the desired starting material; where $n$ and Hal have the aforementioned significance.

The free bases of the invention form acid-addition salts with a variety of inorganic and organic acids. Pharmaceutically acceptable acid-addition salts are formed with acids such as hydrochloric, hydrobromic, hydriodic, sulfuric, acetic, benzoic, citric, maleic, malic, gluconic, ascorbic, pamoic and related acids. The acid-addition salts can be formed by the reaction of the free base with the selected acid, by metathesis, by ion exchange, or by other salt forming means. The free bases of the invention also form quaternary ammonium salts. Pharmaceutically acceptable quaternary ammonium salts are formed with salt forming agents such as methyl iodide, ethyl chloride, ethyl bromide, ethyl iodide, benzyl chloride, and methyl p-toluenesulfonate. The free bases and salts are generally equivalent for the purposes of the invention except that one or the other may be preferred for particular solubility properties. Both the free bases and salts of the invention can exist as cis-trans isomers.

The compounds of the invention are new chemical compounds that are useful pharmacological agents exhibiting antiprogestational, hypocholesteremic, and antifertility activity. Their antiprogestational effect is determined in a modified McPhail assay [see M. K. McPhail, J. Physiology (London), Vol. 83, 1934, page 145] by administering the test compound together with progesterone to each of a group of five rabbits and then measuring the reduction of endometrial proliferation in comparison with the endometrial proliferation observed in a group of five control animals receiving only progesterone. In this test, the administration of 10 mg. of α-{p-[3-(dimethylamino)propoxy]phenyl}-α'-nitro-4-methoxystilbene monocitrate concomitantly with 1.6 mg. of progesterone effected an 80–90 percent reduction of endometrial proliferation in this species of test animal. (On the McPhail index, the controls were rated at a mean value of 3.6 and the test animals were rated at a mean value of 0.5.)

By virtue of their strong antiprogestational activity, the compounds of the invention have been found to be effective antifertility agents when administered postcoitally to rabbits. In this test an adult female rabbit is mated three times in quick succession and then, beginning on the day of mating, is treated orally with a given dose of the test compound once each day for 14 days. On the 15th day the animal is sacrificed and the uterus is examined for implantation sites and gross abnormalities. When tested by this method, α-{p-[3-(dimethylamino)propoxy]phenyl}-α'-nitro-4-methoxystilbene monocitrate, administered at a dose level of 3.0 mg./kg. by stomach tube in aqueous solution to each of a group of five rabbits, was found to be completely effective in inhibiting pregnancy. The compounds of the invention are also effective as antifertility agents when administered postcoitally to dogs. In this species, the compound named above completely prevented the birth of litters when administered in a single, daily, oral dose of 500 μg./kg. for 15 days following the first mating of an adult female that is mated three times, once each day on the 1st, 3rd, and 5th days of the test period.

As hypocholesteremic agents, the compounds of the invention cause a decrease in the level of blood cholesterol. This activity is determined in rats weighing 200–250 g. by administering the test compound by daily intubation for 1 week at a given dose level and then comparing the average plasma cholesterol level of the treated animals with that of control animals. In this test, α-{p-[3-(dimethylamino)propoxy]-phenyl}-α'-nitro-4-methoxystilbene, which is the preferred hypocholesteremic compound of the invention, when administered as the monocitrate salt at a dose level of 50 μg./kg., was found to effect a 44 percent lowering of the cholesterol level. This compound is particularly preferred in this regard because its administration does not lead to any traceable accumulation of desmosterol.

The invention is illustrated by the following examples.

EXAMPLE 1

With stirring, 5.6 g. of 90 percent nitric acid is added dropwise to a solution of 16 g. of 1-{p-[3-(dimethylamino)-propoxy]phenyl}-1-(p-methoxyphenyl)-2-phenylethanol in 60 ml. of acetic acid. During the addition, the temperature of the reaction mixture rises to approximately 45° C. After 1 hour, the mixture is concentrated, and the oily residue is diluted with a small amount of water and made basic to pH 11 with aqueous sodium hydroxide. The alkaline mixture is then extracted with benzene, and the benzene extract is evaporated to dryness to yield α-{p-[3-(dimethylamino)propoxy]phenyl}-α'-nitro-4-methoxystilbene, obtained as a yellow oil that is a mixture of isomers. Fractional crystallization from aqueous ethanol gives, in approximately equal amounts, a high-melting isomer, m.p. 103°–106° C., and a low-melting isomer, m.p. 92°–95 C.

A solution of 8.3 g. of the yellow oily product obtained above in 15 ml. of 2-butanone is added to a hot solution of 3.8 g. of citric acid monohydrate in 25 ml. of 2-butanone, and upon cooling to room temperature, there is obtained a precipitate of α-{p-[3-(dimethylamino)propoxy]-phenyl}-α'-nitro-4-methoxystilbene monocitrate, obtained as a mixture of isomers, m.p. 78°–80° C. In a similar manner, the monocitrate salts of the high-melting and low-melting isomers, which have melting points of 90°–92° C. and 161°–163° C., respectively, are obtained.

The acetate salt of α-{p-[3-(dimethylamino)propoxy]-phenyl}-α'-nitro-4-methoxystilbene is obtained by dissolving 3 g. of the free base in 25 ml. of acetic acid and evaporating the solution to dryness under reduced pressure. The sulfate salt is obtained by dissolving 4.32 g. of the free base in 100 ml. of 0.1 N sulfuric acid and then freezing and lyophilizing the solution.

The methiodide salt is obtained by treating a cooled solution of 5 g. of the free base in 50 ml. of acetonitrile with 7.5 ml. of methyl iodide, allowing the mixture to stand overnight and then pouring it into 500 ml. of ether and collecting the insoluble product.

The starting material used in the foregoing procedure is obtained as follows. A mixture consisting of 44 g. of anisic acid, 64 g. of 3-bromopropyl phenyl ether, and 400 g. of polyphosphoric acid is heated for 2 hours at 80°–95° C. and is then poured into 1,500 ml. of cold water. The aqueous mixture is extracted with chloroform, and the chloroform extract is washed well with dilute aqueous sodium hydroxide, dried, and evaporated to dryness to give 4-(3-bromopropoxy)-4'-methoxybenzophenone; m.p. 65°–68°C., following crystallization from ethyl acetate-petroleum ether. A mixture of 34 g. of this intermediate product and 250 ml. of isopropyl alcohol saturated with anhydrous dimethylamine is stirred and heated under reflux for 6 hours while anhydrous dimethylamine is bubbled through the mixture. The reaction mixture is then concentrated to small volume, diluted with water, treated with aqueous sodium hydroxide, and extracted with chloroform. The chloroform extract is dried and evaporated to give 4-[3-(dimethylamino)propoxy]-4'-methoxybenzophenone; m.p. 59°–62 C., following crystallization from ethyl acetate-petroleum ether. A solution of 15 g. of this second intermediate product in 40 ml. of tetrahydrofuran is carefully added to a stirred, ethereal solution of benzyl magnesium chloride (prepared from 2.4 g. magnesium, 13 g. of benzyl chloride, and 10 ml. of ether). The mixture is heated under reflux for 2 hours and then carefully treated with an excess of saturated aqueous ammonium chloride. The organic phase is separated, dried, and evaporated to give the desired 1-{p-[3-(dimethylamino)propoxy]phenyl}-1-(p-methoxyphenyl)-2-phenylethanol starting material; m.p. 95°–96° C., following crystallization from ether-petroleum ether.

EXAMPLE 2

Utilizing the procedure of example 1 above, with the substitution of an equivalent amount of 1-{p-[4-(dimethylamino)butoxy]henyl}-1-(p-methoxyphenyl)-2-phenyl-ethanol for the 1-{p-[3-(dimethylamino)propoxy]phenyl}-1-(p-methoxyphenyl)-2-phenylethanol, there is obtained α-{p-[4-(dimethylamino)butoxyl|phenyl}-α'-nitro-4-methoxystilbene, isolated as an oil that is converted as in example 1 above to the monocitrate salt, m.p. 90°–93° C.

The 1-{p-[4-(dimethylamino)butoxy]phenyl}-1-(p-methoxyphenyl)-2-phenylethanol starting material is obtained by reacting 4-bromobutyl phenyl ether with anisic acid to give 4-(4-bromobutoxy)-4'-methoxybenzophenone, further reacting this first intermediate with dimethylamine to give 4-[4-(dimethylamino)butoxy]4'-methoxybenzophenone, and finally reacting this second intermediate product with benzyl magnesium chloride and hydrolyzing the reaction mixture, all according to procedures analogous to those described in example 1 above.

EXAMPLE 3

During a period of 1 minute, with the temperature maintained below 30° C. by means of a Dry Ice bath, 4.5 g. of 70 percent nitric acid is added to 30 ml. of acetic anhydride, the resulting mixture is cooled to −15° C., and two drops of concentrated sulfuric acid are added. To this mixture is added a solution of 11 g. of α-{p-[3-(dimethylamino)propoxy]phenyl}-4-methoxystilbene in 10 ml. of acetic anhydride over a period of about 30 seconds with external cooling to maintain the temperature of the reaction mixture below 10° C. The mixture is then poured into 150 ml. of water and, after hydrolysis is complete, the aqueous mixture is made strongly basic with aqueous sodium hydroxide. The strongly alkaline mixture is extracted with benzene, and the benzene extract is dried and evaporated under reduced pressure. The residue of 1-(p-methoxyphenyl)-1-acetoxy-1-{p-[3-(dimethylamino)propoxy]phenyl}-2-nitro-2-phenylethane is heated at 90°–100° C. with 50 ml. of 85 percent phosphoric acid for 1 hour. Upon cooling, this mixture is poured into water, made strongly basic with aqueous sodium hydroxide, and extracted with benzene. The benzene extract is dried and evaporated under reduced pressure to give α-{p-[3-(dimethylamino)propoxy]phenyl}-α'-nitro-4-methoxystilbene, isolated as a yellow oil that is a mixture of isomers. Fractional crystallization from aqueous ethanol gives, in approximately equal amounts, a high-melting isomer, m.p. 103°–106° C., and a low-melting isomer, m.p. 92°–96 C. The hydrochloride salt is obtained by treating an ethereal solution of the free base oil with anhydrous hydrogen chloride; m.p. 140°–145° C., following crystallization from ethanol-ether mixtures treated with hydrogen chloride. A salt with pamoic acid, 4,4'-methylenebis-(3-hydroxy-2-naphthoic acid), is obtained by mixing aqueous solutions of the hydrochloride and sodium pamoate and collecting the insoluble product on a filter.

The starting material used in the foregoing procedure is obtained as follows. A solution of 12 g. of 1-{ p-[3-(dimethylamino)propoxy]phenyl}-1-(p-methoxyphenyl)-2-phenylethanol in 100 ml. of absolute ethanol that has been saturated with dry hydrogen chloride is heated under reflux for 2 hours and then evaporated to dryness. The solid α-{p-[3-(dimethylamino)propoxy]phenyl}-4-methoxystilbene hydrochloride, m.p. 183°–185° C., that is obtained is dissolved in water, and the aqueous solution is neutralized with 20 percent aqueous sodium hydroxide. The neutral aqueous solution is then extracted with ether, and the ether extract is dried and evaporated to give the desired starting material, suitable for use without further purification.

EXAMPLE 4

A mixture consisting of 21 g. of 1-{p-[3-(dimethylamino)propoxy]phenyl}-1-(p-methoxyphenyl)-2-nitro-2-phenylethane, 10 ml. of nitrobenzene, 3 g. of 20 percent palladium on carbon catalyst, and 100 ml. of xylene is stirred and heated under reflux for 24 hours. An additional 3 g. of fresh catalyst is then added, and the mixture is heated under reflux for 10 hours more. The mixture is then filtered, and the filtrate is evaporated under reduced pressure to give α-{p-[3-(dimethylamino)propoxy]phenyl}-α'-nitro-4-methoxystilbene, isolated as an oily mixture of isomers. The citrate salt, prepared from this oil by reaction with citric acid monohydrate in 2-butanone, softens at 85° C. and is completely melted at 135° C.

The starting material used above is prepared as follows. A solution of 22 g. of 4-methoxy-α'-nitrostilbene in 100 ml. of tetrahydrofuran is slowly added to a cooled solution of p-[3-(dimethylamino)propoxy]phenyl magnesium bromide prepared from 26 g. of p-[3-(dimethylamino)propoxy]-bromobenzene and 2.5 g. of magnesium in 90 ml. of anhydrous tetrahydrofuran. The resulting mixture is stirred and heated under reflux for 30 minutes and is then poured carefully into 200 ml. of saturated aqueous ammonium chloride. The aqueous mixture is extracted with ether, and the ether extract is washed with water and extracted with 200 ml. of 1 N hydrochloric acid. The acidic aqueous extract is then made alkaline with 50 percent aqueous sodium hydroxide, and the resulting alkaline mixture is extracted with ether. After drying over anhydrous magnesium sulfate, the ether extract is evaporated to give the desired 1-{p-[3-(dimethylamino)propoxy]phenyl}-1-(p-methoxyphenyl)-2-nitro-2 -phenylethane starting material, suitable for use without further purification.

EXAMPLE 5

A mixture consisting of 5 g. of 1-{p-[3-(dimethylamino)propoxy] phenyl}-1-(p-methoxyphenyl)-2-nitro-2-phenylethane, 5 g. of 2,3-dichloro-5,6-dicyano-p-benzoquinone, and 200 ml. of dioxane is treated at room temperature with dry hydrogen chloride for 30 minutes and is then kept at room temperature overnight. After dilution with 500 ml. of methylene dichloride, the mixture is poured with stirring into excess 5 percent aqueous sodium hydroxide. The organic phase is separated, dried, and evaporated to give an oily residue of α-{p-[3-(dimethylamino)propoxy]phenyl}-α'-nitro-4-methoxystilbene. This oily product is dissolved in ether, and the ethereal solution is treated with anhydrous hydrogen chloride to precipitate α-{p-[3-(dimethylamino)propoxy]phenyl}-α'-nitro-4-methoxy-stilbene hydrochloride monohydrate; m.p. 140°–145° C., following crystallization from ethanol-ether mixtures treated with hydrogen chloride.

EXAMPLE 6

With stirring, 1.0 g. of a 50 percent dispersion of sodium hydride in mineral oil is added in portions to a solution of 7 g.

of α-(p-hydroxyphenyl)-α'-nitro-4-methoxystilbene in 75 ml. of N,N-dimethylformamide. After 10 minutes, a solution of 10 g. of N,N-dimethyl-3-bromopropylamine in 200 ml. of ether is added, and the resulting mixture is slowly heated to 90° C. and kept at that temperature for 2 hours with continuous stirring. It is then cooled, diluted with 300 ml. of benzene, washed successively with water, dilute aqueous sodium hydroxide, and aqueous sodium chloride, dried, and evaporated to give a residue of α-{p-[3-(dimethylamino)- propoxy]phenyl}-α'-nitro-4-methoxystilbene. The monocitrate salt, m.p. 78°–80° C., is prepared by reacting the oily free base with citric acid monohydrate in 2-butanone.

In the foregoing procedure, with the substitution of 10.8 g. of N,N-dimethyl-4-bromobutylamine for the N,N-dimethyl-3-bromopropylamine, there is obtained α-{p-[4-(dimethylamino)butoxy]phenyl}-α'-nitro-4-methoxystilbene, isolated as an oil that is converted as above to the monocitrate salt, m.p. 90°–93° C.

The α-(p-hydroxyphenyl)-α'-nitro-4-methoxystilbene used as starting material in the foregoing procedure is prepared as follows. To a solution of benzyl magnesium chloride (prepared from 14 g. of magnesium, 76 g. of benzyl chloride, and 300 ml. of ether), heated under reflux, is gradually added a solution of 46 g. of 4-hydroxy-4'-methoxybenzophenone in 300 ml. of tetrahydrofuran, and the resulting mixture is heated under reflux for 4 hours. Upon cooling, it is carefully treated with an excess of saturated aqueous ammonium chloride, and the organic phase is separated, dried and evaporated to give an oily residue of 1-(p-hydroxyphenyl)-1-(p-methoxyphenyl)-2-phenylethanol, which is purified by crystallization from ethyl acetate-petroleum ether; m.p. 124°–126° C. This intermediate product (38.6 g.) is added to 250 ml. of acetic anhydride, and the resulting mixture is heated under reflux overnight and evaporated under reduced pressure to give an oily residue of α-(p-acetoxyphenyl)-4-methoxystilbene, suitable for use in the following step without further purification. To a solution of 41.3 g. of α-(p-acetoxyphenyl)-4-methoxystilbene in 180 ml. of acetic acid is added dropwise at room temperature 8.5 g. of 90 percent nitric acid. The reaction mixture is stirred at 10° C. for 90 minutes, and the solid α-(p-acetoxyphenyl)-α'-nitro-4-methoxystilbene that precipitates is isolated by filtration; m.p. 140°–160° C. This intermediate (12 g.) is dissolved in 200 ml. of methanol, 60 ml. of 1 N sodium hydroxide is added, and the resulting mixture is heated under reflux for 1 hour and then evaporated under reduced pressure. The residue is treated with excess 5 percent hydrochloric acid, and the acidic mixture is extracted with chloroform. The chloroform extracts are dried over anhydrous magnesium sulfate and evaporated to dryness to give the desired α-(p-hydroxyphenyl)-α'-nitro-4-methoxystilbene starting material; m.p. 190°–195° C.

EXAMPLE 7

Anhydrous dimethylamine is passed into a stirred solution of 9 g. of α-[p-(3-bromopropoxy)phenyl]-α'-nitro--4-methoxystilbene in 250 ml. of isopropyl alcohol for a period of 3 hours. The resulting mixture is heated under reflux overnight and then evaporated to give an oily residue that is dissolved in 100 ml. of ethyl acetate. The ethyl acetate solution is washed with saturated aqueous sodium chloride, dried, and evaporated to give α-{p-[3-(dimethylamino)propoxy]phenyl}-α'-nitro-4-methoxystilbene, obtained as an oil that is converted by reaction with citric acid monohydrate in 2-butanone to give a monocitrate salt, m.p. 78°–80° C.

The starting material is obtained as follows. A mixture of 44 g. of anisic acid, 64 g. of 3-bromopropyl phenyl ether, and 400 g. of polyphosphoric acid is heated at 80°–95° C. for 2 hours and is then poured into 1.5 liters of cold water. The aqueous mixture is extracted with chloroform, and the chloroform extracts are washed with dilute aqueous sodium hydroxide, dried, and evaporated to give 4-(3-bromopropoxy)-4'-methoxybenzophenone; m.p. 65°–68° C., following crystallization from ethyl acetate-petroleum ether. A solution of 25 g. of this product in 70 ml. of tetrahydrofuran is carefully added to a stirred ethereal solution of benzyl magnesium chloride (prepared from 2.4 g. of magnesium, 13 g. of benzyl chloride, and 10 ml. of ether). The mixture is heated under reflux for 2 hours and then carefully treated with an excess of saturated aqueous ammonium chloride. The organic phase is separated, dried, and evaporated to give 1-[p-(3-bromopropoxy)phenyl]-1-(p-methoxyphenyl)-2-phenylethanol; m.p. 83°–85° C., following crystallization from ethyl acetate-petroleum ether. This second intermediate product (22 g.) is added to 200 ml. of acetic anhydride, and the resulting mixture is heated under reflux overnight and is then evaporated under reduced pressure. The residue is treated with water, and the aqueous mixture is extracted with chloroform. After drying, the chloroform extract is evaporated to give an oily residue of α-[p-(3-bromopropoxy)phenyl]-4-methoxystilbene, suitable for use in the following step without further purification. To s solution of 20 g. of α-[p-(3-bromopropoxy)phenyl]-4-methoxystilbene in 60 ml. of acetic acid is added dropwise at room temperature 3.5 g. of 90 percent nitric acid. After 1 hour, the mixture is cooled to 4° C. and filtered to give the desired α-[p-(3-bromopropoxy)phenyl]-α'-nitro-4-methoxystilbene starting material, obtained as a mixture of isomers; m.p. 124°–138° C. Fractional crystallization from acetone yields two isomers, m.p. 134°–136° C. and 149°–152° C., respectively.

EXAMPLE 8

A solution of 7.5 g. of α-[p-(4-bromobutoxy)-phenyl]-α'-nitro-4-methoxystilbene in 250 ml. of isopropyl alcohol is stirred and heated under reflux while a stream of anhydrous dimethylamine is passed into it during a period of 3 hours. The reaction mixture is heated under reflux overnight and is then concentrated to an oily residue, which is dissolved in 200 ml. of chloroform. The chloroform solution is washed with 300 ml. of 1 N sodium hydroxide and with water, dried, and evaporated to give α-{p4-(dimethylamino)-butoxy]phenyl} α'-nitro-4-methoxystilbene, obtained as an oil that is converted by reaction with citric acid monohydrate in 2-butanone to the monocitrate salt; m.p. 90°–93° C.

The α-[p-(4-bromobutoxy)phenyl]-α'-nitro-4-methoxy-stilbene starting material, m.p. 97°–101° C., is prepared by reacting 4-bromobutyl phenyl ether with anisic acid to give 4-(4-bromobutoxy)-4'-methoxybenzophenone, m.p. 87°–89° C., further reacting this first intermediate with benzyl magnesium chloride, followed by hydrolysis of the reaction mixture, to given 1-[p-(4-bromobutoxy)phenyl]-1-(p-methoxyphenyl)-2-phenylethanol, m.p. 74°–78° C., and finally reacting this second intermediate with 90 percent nitric acid in glacial acetic acid solution, all according to procedures analogous to those described in example 7 above.

I claim:

1. A member of the class consisting of α-[p-(dimethylaminoalkoxy)phenyl]-α'-nitro-4-methoxystilbene compounds having in free base form the formula

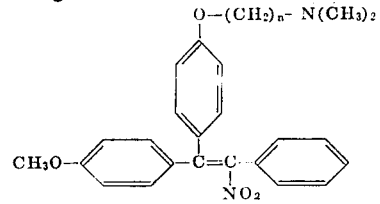

and pharmaceutically acceptable acid-addition salts thereof; where n is a positive integer selected from between 3 and 4.

2. A compound according to claim 1 which is α-{p-[3-(dimethylamino)propoxy]phenyl}-α'-nitro-4-methoxystilbene.

3. A compound according to claim 1 which is α-{p-[3-(dimethylamino)propoxy]phenyl}-α'-nitro-4-methoxystilbene citrate.

4. A compound according to claim 1 which is α-{p-[3-(dimethylamino)propoxy]phenyl}-α'-nitro-4-methoxystilbene hydrochloride.

5. A compound according to claim 1 which is α-{p-[4-(dimethylamino)butoxy]henyl}-α'-nitro-4-methoxystilbene.

6. A compound according to claim 1 which is α{p-[4-(dimethylamino)butoxy]henyl}-α'-nitro-4-methoxystilbene citrate.

* * * * *